(12) United States Patent
Lin et al.

(10) Patent No.: US 9,124,571 B1
(45) Date of Patent: Sep. 1, 2015

(54) NETWORK AUTHENTICATION METHOD FOR SECURE USER IDENTITY VERIFICATION

(71) Applicant: KEYPASCO AB, Gothenburg (SE)

(72) Inventors: Maw-Tsong Lin, Taipei (TW); Per Skygebjerg, Gothenburg (SE)

(73) Assignee: KEYPASCO AB, Gothenburg (SE)

( * ) Notice: Subject to any disclaimer, the term of this patent is extended or adjusted under 35 U.S.C. 154(b) by 0 days.

(21) Appl. No.: 14/187,903

(22) Filed: Feb. 24, 2014

(51) Int. Cl.
*H04L 29/06* (2006.01)
*H04L 9/30* (2006.01)

(52) U.S. Cl.
CPC ........ *H04L 63/08* (2013.01); *H04L 9/30* (2013.01); *H04L 63/06* (2013.01); *H04L 63/0823* (2013.01); *H04L 63/123* (2013.01)

(58) Field of Classification Search
CPC .................................................. H04L 63/0823
USPC .......................................................... 713/155
See application file for complete search history.

(56) References Cited

U.S. PATENT DOCUMENTS

| | | | |
|---|---|---|---|
| 7,861,077 | B1 | 12/2010 | Gallagher, III |
| 2005/0165698 | A1 | 7/2005 | Cho et al. |
| 2009/0144812 | A1 | 6/2009 | Sasamura et al. |
| 2013/0159704 | A1* | 6/2013 | Chandrasekaran ............ 713/156 |

FOREIGN PATENT DOCUMENTS

| | | |
|---|---|---|
| EP | 2 355 443 A2 | 8/2011 |
| TW | 201225697 A1 | 6/2012 |
| WO | WO 02/089018 A1 | 11/2002 |

OTHER PUBLICATIONS

Search Report issued by EPO in European Counterpart Application No. 14157508.4 on Aug. 21, 2014.
Search Report appended in an Office Action issued by Taiwan Intellectual Property Office in Taiwanese Counterpart Application No. 101140767 on Aug. 14, 2014, and corresponding English translation.

* cited by examiner

*Primary Examiner* — Longbit Chai
(74) *Attorney, Agent, or Firm* — Hamre, Schumann, Mueller & Larson, P.C.

(57) ABSTRACT

In a network authentication method, a content-provider server redirects a user terminal to an identity verification server for acquiring therefrom an encrypted web address signed with an asymmetrical private key and downloaded from a downloading unit. The user terminal transmits hardware scan data associated therewith to the identity verification server upon determining, based on the encrypted web address and an asymmetrical public key from the downloading unit, that the identity verification server is currently valid to perform identity verification. The identity verification server verifies the identity of the user terminal based on relationship between the hardware scan data and pre-stored reference hardware scan data.

9 Claims, 5 Drawing Sheets

NETWORK AUTHENTICATION METHOD FOR SECURE USER IDENTITY VERIFICATION

BACKGROUND OF THE INVENTION

1. Field of the Invention

The invention relates to network identity authentication, and more particularly to a network authentication method for secure verification of identity of a user.

2. Description of the Related Art

Currently, a variety of web services, such as cloud services, have become increasingly popular. In order to secure the web services, user identity verification is absolutely necessary.

However, due to increasing numbers of web users and web crimes, and continuous progress of criminal techniques, for example, an Internet content provider (ICP) needs to provide to each user an identity verification device, e.g., a USB device loaded with a public key infrastructure (PKI) certificate, an integrated circuit (IC) electronic card or a dynamic token. Thus, the cost of customer service for personalization, distribution and troubleshooting is considerable. Further, it is quite inconvenient that the user needs to remember the user ID and the password for each of different ICPs and to have different identity verification devices for the different ICPs. Moreover, for the different ICPs, duplication of investment in user identity authentication may occur.

SUMMARY OF THE INVENTION

Therefore, an object of the present invention is to provide a network authentication method for secure verification of the identity of a user that can overcome the aforesaid drawbacks of the prior art.

According to the present invention, there is provided a network authentication method to be implemented using a user terminal, a downloading unit, a content-provider server and a plurality of identity verification servers for secure verification of the identity of a user of the user terminal. The network authentication method of this invention comprises the following steps of:

a) the user terminal downloading a scan program and an asymmetrical public key from the downloading unit;

b) each of the identity verification server downloading from the downloading unit a respective set of encrypted information that is signed with an asymmetrical private key and that includes an encrypted web address of the identity verification server, and storing reference hardware scan data that is associated with the user terminal and that corresponds uniquely to a user identifier of the user;

c) in response to a user login request from the user terminal for accessing the content-provider server through a first communication link, the content-provider server transmitting to one of the identity verification servers a verification notification that the identity of the user needs to be verified, and redirecting the user terminal for connecting with said one of the identity verification servers through a second communication link;

d) said one of the identity verification servers transmitting to the user terminal the respective set of encrypted information downloaded in step b) through the second communication link;

e) the user terminal determining, based on the respective set of encrypted information transmitted in step d) and the asymmetrical public key downloaded in step a), whether said one of the identity verification servers is currently valid to perform identity verification;

f) upon determining that said one of the identity verification servers is currently valid to perform identity verification, the user terminal executing the scan program downloaded in step a) to obtain hardware scan data associated with the user terminal, and transmitting the hardware scan data thus obtained to said one of the identity verification servers through the second communication link; and g) said one of the identity verification servers verifying the identity of the user based on relationship between the hardware scan data received from the user terminal in step f) and the reference hardware scan data stored in step b), and notifying the content-provider server of a verification result.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
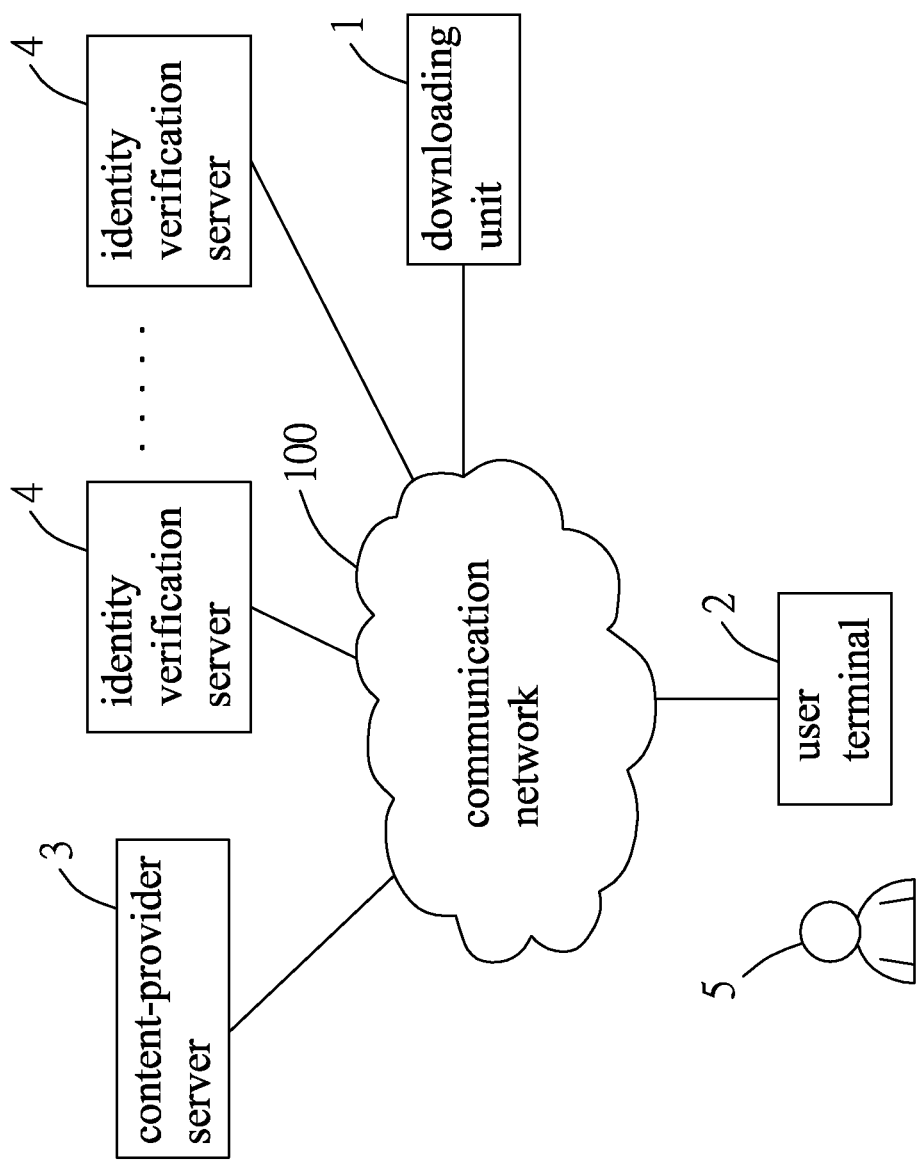
FIG. 1 is a schematic block diagram illustrating a network authentication system that is configured for implementing a network authentication method according to the preferred embodiment of the present invention.

Referring to FIG. 1, a network authentication system is used to implement a network authentication method for secure verification of the identity of a user 5 according to the preferred embodiment of the present invention. The network authentication system includes a downloading unit 1, a user terminal 2 owned by the user 5, a content-provider server 3 (e.g., an internet content provider or ICP), and a plurality of identity verification servers 4. For exemplary purposes, the user terminal 2 is owned by the user 5, and may be an electronic device capable of Internet browsing or data communication, such as a notebook computer, a smart phone, a personal digital assistant, etc. The user terminal 2 includes a plurality of hardware components (not shown), such as a central processing unit, a basic input/output system (BIOS) unit, a storage device, a network interface, a motherboard, etc., each of which has a unique identification code. The content-provider server 3 may be, but is not limited to, a web bank server, an online game server, or any other server that provides a network service requiring identity verification, such as a portal website. The identity verification servers 4 are ideally authorized by the downloading unit 1 to perform third-party identity verification, and may be, but are not limited to, social networking websites, such as Google, Yahoo, Facebook, etc. The downloading unit 1 includes a database unit (not shown) for storing at least one scan program, at least one pair of asymmetrical public and private keys, and a plurality of sets of encrypted information corresponding respectively to the identity verification servers 4. Each set of encrypted information is signed with the asymmetrical private key, and includes an encrypted web address of a respective one of the identity verification servers 4. In particular, each set of encrypted information has been processed with the asymmetrical private key to create a digital signature, and the asymmetrical public key is used to verify the digital signature. The downloading unit 1, the user terminal 2, the content-provider server 3 and the identity verification servers 4 are connected to a communication network 100.

Figure 2:
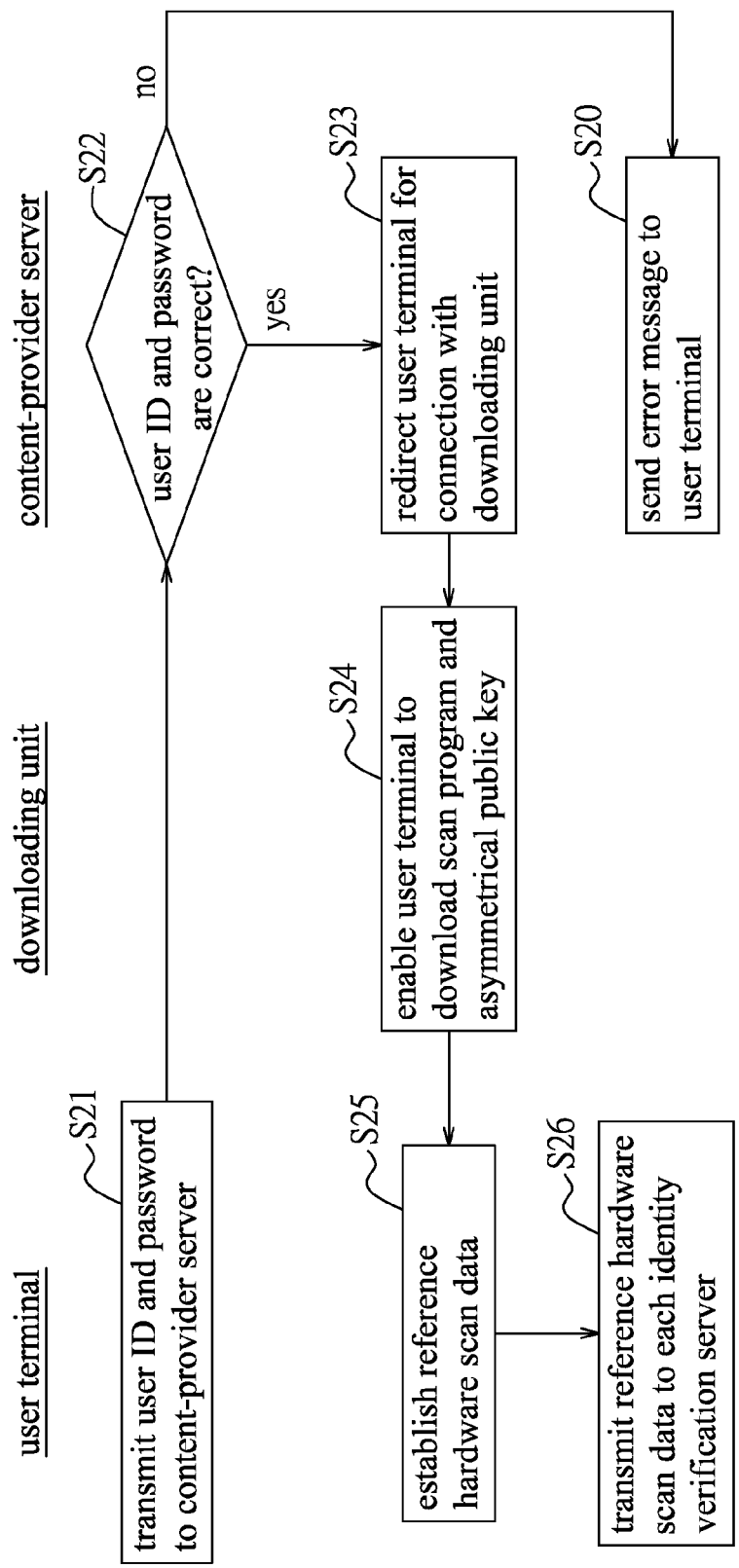
FIG. 2 is a flowchart illustrating a registration procedure of the network authentication method of the preferred embodiment.

Referring to FIGS. 1 and 2, the downloading unit 1 cooperates with the user terminal 2 and the content-provider server 3 to implement a registration procedure of the network authentication method of the preferred embodiment according to the present invention. The registration procedure of the network authentication method of the preferred embodiment includes the following steps. It is noted that, prior to the registration procedure, each of the identity verification servers 4 is connected to the downloading unit 1 through the communication network 100 for downloading a respective set of encrypted information from the downloading unit 1.

In step S21, the user 5 inputs a user identification (ID) serving as a user identifier, and a password using a user input interface (not shown) of the user terminal 2 at a website provided by the content-provider server 3. The user ID and the password are then transmitted from the user terminal 2 to the content-provider server 3 via the communication network 100.

In step S22, in response to receipt of the user ID and the password, the content-provider server 3 is operable to check whether the user ID and the password are correct. If the result is affirmative, the flow proceeds to step S23. Otherwise, the content-provider server 3 is operable to send an error message to the user terminal 2 for displaying on a display device (not shown) of the user terminal 2 (step S20).

In step S23, the content-provider server 3 is operable to redirect the user terminal 2 for connection with the downloading unit 1.

In step S24, the downloading unit 1 is operable to enable the user terminal 2 to download the scan program and the asymmetrical public key therefrom.

In step S25, after the user terminal 2 stores the scan program and the asymmetrical public key, the user terminal 2 is operable to execute the scan program for scanning the hardware components of the user terminal 2 to obtain the identification codes of the hardware components, and for establishing reference hardware scan data according to the identification codes of the hardware components thus obtained. The reference hardware scan data is associated with the user terminal 2, and corresponds uniquely to the user identifier of the user 5.

In step S26, the user terminal 2 is operable to transmit the reference hardware scan data to each of the identity verification servers 4 via the communication network 100, so that each of the identity verification servers 4 stores the reference hardware scan data received from the user terminal 2.

Figure 3:
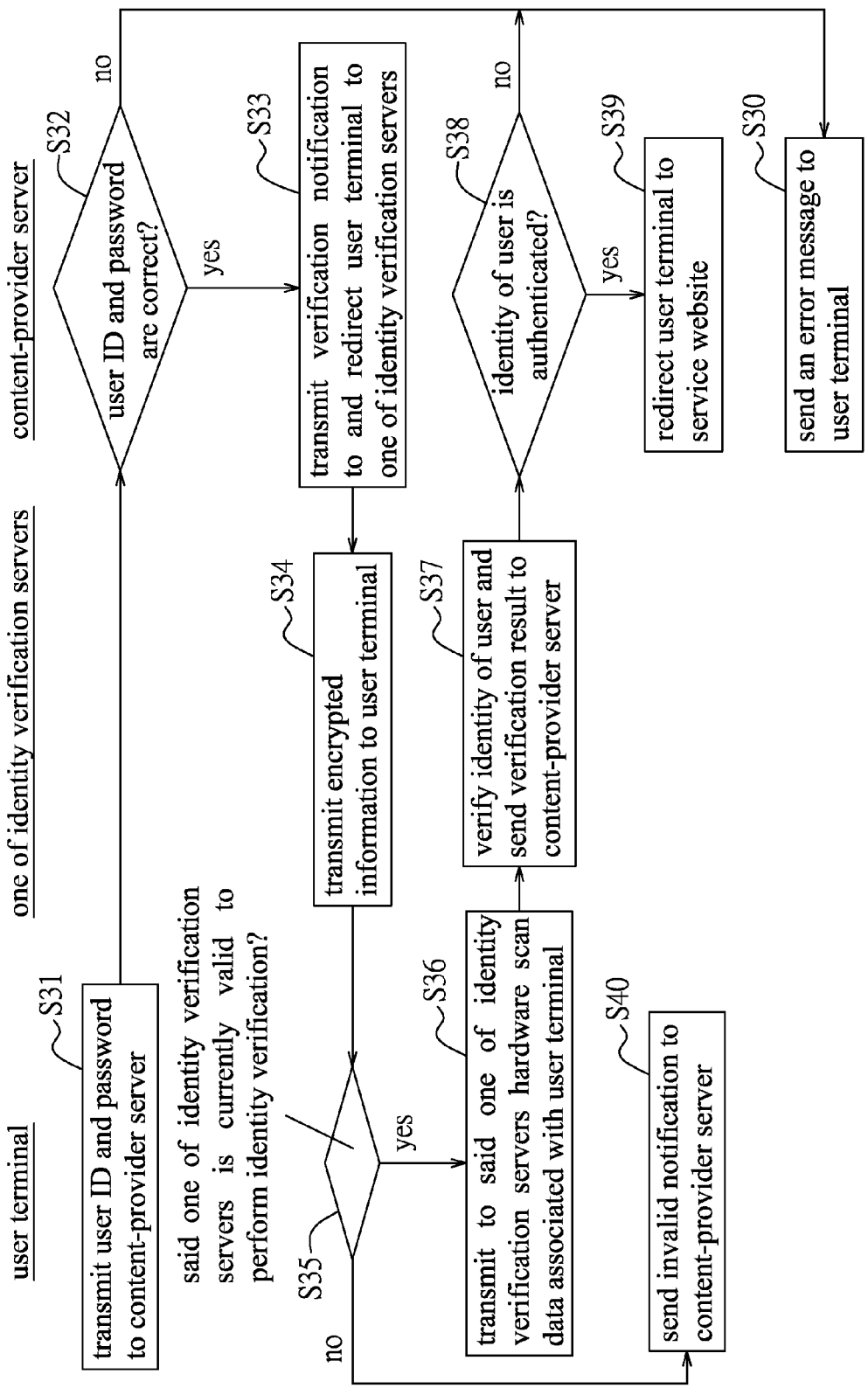
FIG. 3 is a flow chart illustrating a login procedure of the network authentication method of the preferred embodiment.

Referring to FIGS. 1 and 3, the network authentication system implements a login procedure of the network authentication method of the preferred embodiment. The login procedure of the network authentication method of the preferred embodiment includes the following steps.

In step S31, the user 5 inputs the user ID and the password using the user input interface of the user terminal 2 at the service website provided by the content-provider server 3, and the user terminal 2 is operable to transmit the user ID and the password to the content-provider server 3 through a first communication link over the communication network 100.

In step S32, in response to receipt of the user ID and the password from the user terminal 2, the content-provider server 3 is operable to check whether the user ID and the password are correct. If the result is affirmative, the flow proceeds to step S33. Otherwise, the content-provider server 3 is operable to send an error message to the user terminal 2 for displaying on the display device of the user terminal 2 (step S30).

Figure 4:
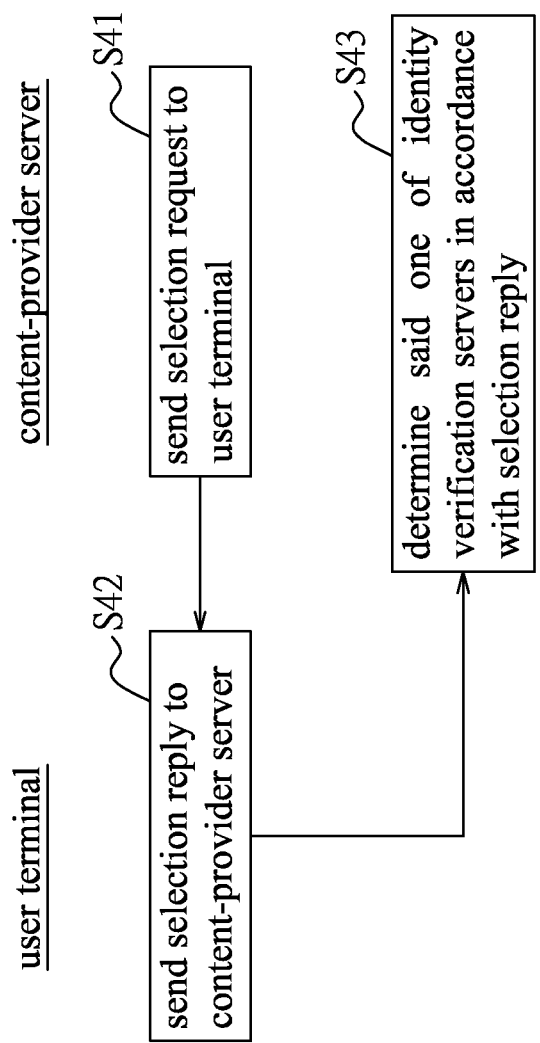
FIG. 4 is a flowchart of a procedure illustrating how one of identity verification servers is determined to perform identity verification in the preferred embodiment.

In step S33, the content-provider server 3 is operable to transmit to one of the identity verification servers 4 a verification notification that the identity of the user 5 needs to be verified. The content-provider server 3 is further operable to redirect the user terminal 2 for connecting with said one of the identity verification servers 4 through a second communication link that is separate from the first communication link. It is noted that, in one embodiment, said one of the identity verification servers 4 is determined by the content-provider server 3. In another embodiment, said one of the identity verification servers 4 may be determined by the user 5. Referring further to FIG. 4, a procedure is shown to illustrate how one of the identity verification servers 4 for performing identity verification is determined by the user 5. In sub-step S41, the content-provider server 3 is operable to send to the user terminal 2 a selection request that includes a list of option items, which represent respectively the identity verification servers 4. In response to the selection request from the content-provider server 3, the user terminal 2 is operable to send to the content-provider server 3 a selection reply that indicates a desired one of the option items representing a corresponding one of the identity verification servers 4 (sub-step S42). Therefore, the content-provider server 3 is operable to determine the corresponding one of the identity verification servers 4 for performing identity verification in accordance with the selection reply (sub-step S43).

In step S34, in response to receipt of the verification notification from the content-provider server 3, said one of the identity verification servers 4 is operable to transmit the respective set of encrypted information stored therein to the user terminal 2 through the second communication link.

In step S35, upon receipt of the respective set of encrypted information from said one of the identity verification servers 4, the user terminal 2 is operable to determine, based on the respective set of encrypted information and the asymmetrical public key stored in step S24 of the registration procedure, whether said one of the identity verification servers 4 is currently valid to perform identity verification.

In one embodiment, the user terminal 2 is operable to decrypt the encrypted web address of the respective set of encrypted information using the asymmetrical public key. Upon successful decryption of the encrypted web address, the user terminal 2 determines that said one of the identity verification servers 4 is currently valid to perform identity verification. Then, the flow proceeds to step S36. On the other hand, upon failed decryption of the encrypted web address of the encrypted information, it is determined by the user terminal 2 that said one of the identity verification servers 4 is currently invalid to perform identity verification. Then, the user terminal 2 is operable to send to the content-provider server 3 an invalid notification that said one of the identity verification servers 4 is invalid to perform identity verification (step S40).

Figure 5:
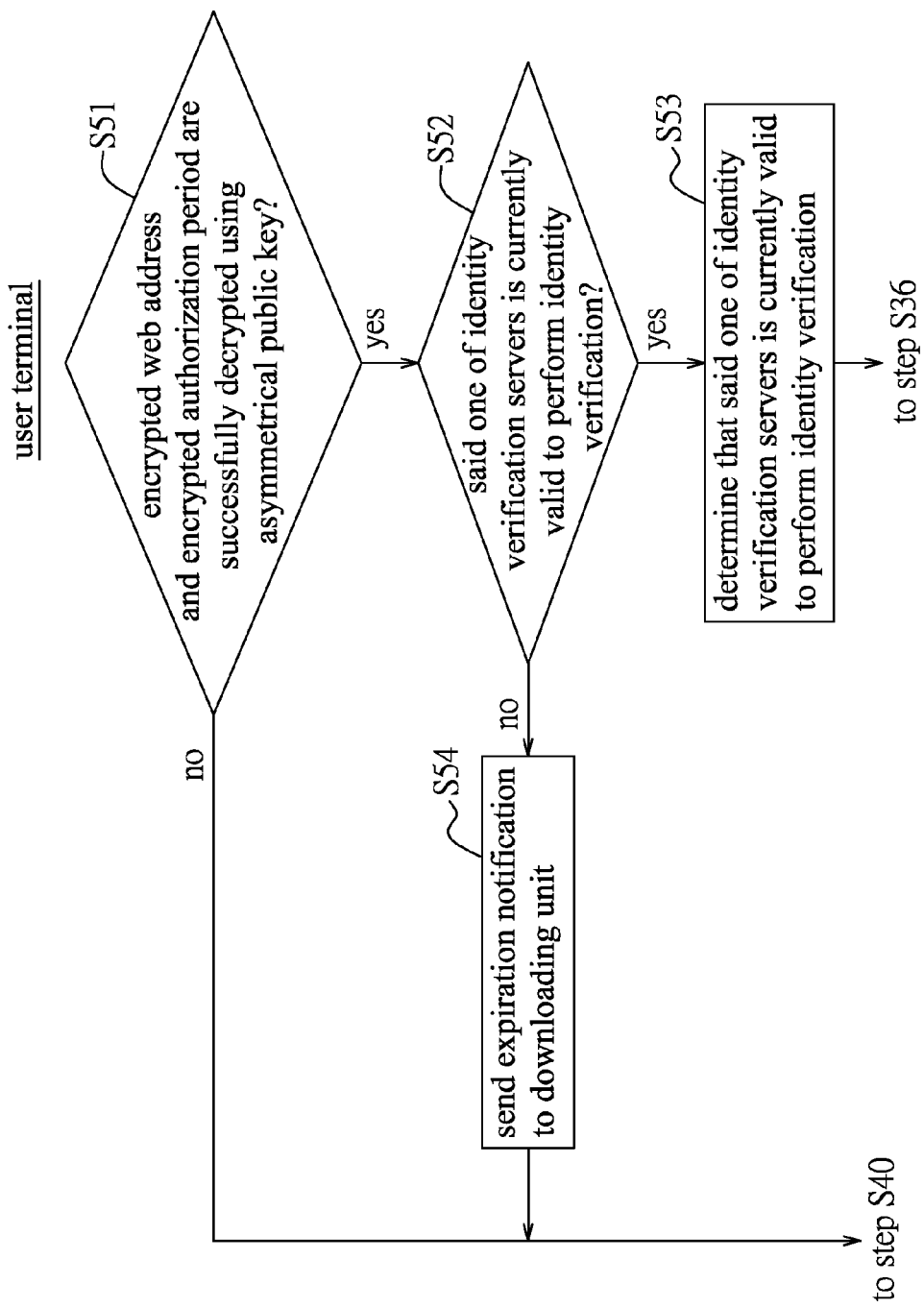
FIG. 5 is a flowchart of a procedure illustrating how a user terminal determines whether said one of the identity verification servers is currently valid to perform identity verification in the preferred embodiment.

In another embodiment, each set of encrypted information, which is stored in the database unit of the downloading unit 1 and corresponds to one of the identity verification servers 4, further includes an encrypted authorization period associated with the identity verification server 4. Referring further to FIG. 5, a procedure is shown to illustrate how the user terminal 2 determines, in step S35, whether said one of the identity verification servers 4 is currently valid to perform identity verification. In sub-step S51, the user terminal 2 is operable to determine whether the encrypted web address and the encrypted authorization period (i.e., the set of encrypted information) of said one of the identity verification servers 4 are successfully decrypted using the asymmetrical public key. If the result is negative, the flow goes to step S40 of FIG. 3. On the other hand, upon successful decryption of the encrypted web address and the encrypted authorization period associated with said one of the identity verification servers 4, the user terminal 2 is operable to determine whether the current date is within the decrypted authorization period associated with said one of the identity verification servers 4 (sub-step S52). If the result is affirmative, the user terminal 2 determines that said one of the identity verification servers 4 is currently valid to perform identity verification (step S53). Then, the flow goes to step 36 of FIG. 3. On the other hand, when the user terminal 2 determines that the current date is not within the decrypted authorization period associated with said one of the identity verification servers 4, the user terminal 2 is operable to send to the downloading unit 1 an expiration notification that the authorization period associated with said one of the identity verification servers 4 has expired (step S54). Then, the flow goes to step S40 of FIG. 3.

In step S36, the user terminal 2 is operable to execute the scan program for scanning the hardware components of the user terminal 2 to obtain the identification codes of the hardware components that serve as hardware scan data associated with the user terminal 2, and to transmit the hardware scan data thus obtained to said one of the identity verification servers 4.

In step S37, upon receipt of the hardware scan data from the user terminal 2, said one of the identity verification servers 4 is operable to compare the hardware scan data with the reference hardware scan data stored therein during the registration procedure of the user 5 for verifying the identity of the user 5 associated with the user terminal 2, and to send a verification result to the content-provider server 3. When the hardware scan data obtained in step S36 does not conform with the reference hardware scan data stored in said one of the identity verification servers 4, the verification result indicates that the verification of the identity of the user 5 has failed. On the other hand, when the hardware scan data obtained in step S36 conforms with the reference hardware scan data stored in said one of the identity verification servers 4, the verification result indicates that the verification of the identity of the user 5 is successful.

In step S38, the content-provider server 3 is operable to determine, based on the verification result from said one of the identity verification servers 4, whether the identity of the user 5 is authenticated. When the verification result indicates that the verification of the identity of the user 5 has failed, it is determined by the content-provider server 3 that the identity of the user 5 is not authenticated. Thus, the flow goes to step S30. In this case, the user terminal 2 is denied access to the service website provided by the content-provider server 3. On the other hand, when the verification result indicates that the verification of the identity of the user 5 is successful, it is determined by the content-provider server 3 that the identity of the user 5 is authenticated. Then, the content-provider server 3 is operable to redirect the user terminal 2 for connecting with the service website provided by the content-provider server 3 (step S39). Therefore, the user terminal 2 is authorized to access the service website.

In sum, the network authentication method according to this invention has the following advantages:

1. Since the user terminal 2 is dynamically directed to one of the identify verification servers 4 for further identity verification (i.e., the user terminal 2 may be directed to a different identify verification server 4 every time), and since the respective set of encrypted information stored in each identity verification server 4 and the asymmetrical public key stored in the user terminal 2 may be randomly updated in response to notification from the downloading unit 1 as required, multi-authentication for user identity can be achieved using the downloading unit 1 that provides the respective set of encrypted information to each identity verification server 4, and the asymmetrical public key and the scan program to the user terminal 2.

2. Every time the user terminal 2 implements step S36 of the login procedure of the network authentication method, the user terminal 2 may execute the scan program for scanning the hardware components of the user terminal 2 to obtain the hardware scan data according to the identification codes of the hardware components, and the hardware scan data thus obtained for subsequent use in authenticating the identity of the user by said one of the identity verification servers 4 is dynamic data. Thus, a network content provider does not need to purchase additional equipment for identity authentication, and does not need to provide the user with a dynamic token, an IC electronic card, or a USB device with a PKI certificate. Also, the user 5 does not need to have additional authentication devices for different service websites.

3. Since the user terminal 2 is connected to the content-provider server 3 through the first communication link and is connected to said one of the identity verification servers 4 through the second communication link, it is relatively difficult to attack the first and second communication links simultaneously for stealing and/or tampering the data sent by the user terminal 2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A network authentication method to be implemented using a user terminal, a downloading unit, a content-provider server and a plurality of identity verification servers for secure verification of an identity of a user of the user terminal, said network authentication method comprising following steps of:
   a) the user terminal, when registering at the content-provider server, downloading a scan program and an asymmetrical public key from the downloading unit;
   b) each of the identity verification servers (i) downloading from the downloading unit a respective set of encrypted information signed with an asymmetrical private key, which includes an encrypted web address of the identity verification server, and (ii) storing reference hardware scan data associated with the user terminal uniquely corresponding to a user identifier of the user;
   c) in response to a user login request from the user terminal for accessing the content-provider server through a first communication link, the content-provider server transmitting to one of the identity verification servers a verification notification that the identity of the user needs to be verified, and redirecting the user terminal for connecting to said one of the identity verification servers using a second communication link separate from the first link;

d) said redirected identity verification server transmitting to the user terminal the respective set of encrypted information downloaded in step b) through the second communication link;

e) the user terminal determining whether said redirected identity verification server is currently valid within an authorization period to perform the user identity verification based on at least the respective set of encrypted information received in step d) and the asymmetrical public key downloaded in step a);

f) upon determining that said redirected identity verification server is currently valid to perform the user identity verification, the user terminal executing the scan program downloaded in step a) to obtain hardware scan data associated with the user terminal, and transmitting the obtained hardware scan data to said redirected identity verification server through the second communication link; and g) said redirected identity verification server verifying the identity of the user based on relationship between the hardware scan data received from the user terminal in step f) and the reference hardware scan data stored in step b), and notifying the content-provider server of the user identity verification result.

2. The network authentication method as claimed in claim 1, the user terminal including a plurality of hardware components, each of which has a unique identification code, said network authentication method further comprising, between steps a) and b), the step of:
the user terminal executing the scan program for scanning the hardware components thereof to obtain the identification codes respectively of the hardware components that serve as the reference hardware scan data, and transmitting the reference hardware scan data to each of the identity authentication servers for storage in step b).

3. The network authentication method as claimed in claim 2, wherein, during registration of the user terminal at the content-provider server, the user terminal downloads the scan program and the asymmetrical public key from the downloading unit in step a), and each of the identity verification servers downloads the respective encrypted information from the downloading unit and stores the reference hardware scan data in step b).

4. The network authentication method as claimed in claim 1, wherein, in step c), said one of the identity verification servers is determined by the content-provider server.

5. The network authentication method as claimed in claim 1, wherein, in step c), said one of the identity verification servers is determined by the user terminal.

6. The network authentication method as claimed in claim 5, wherein step c) includes the sub-steps of:
c1) in response to the login request from the user terminal, the content-provider server sending to the user terminal a selection request that includes a list of option items, which represent respectively the identity verification servers;

c2) the content-provider server receiving a selection reply from the user terminal that indicates a desired one of the option items representing said one of the identity verification servers; and c3) the content-provider server redirecting the user terminal for connecting with said one of the identity verification servers in accordance with selection reply from the user terminal.

7. The network authentication method as claimed in claim 1, wherein, in step e):
the user terminal is operable to decrypt the encrypted web address using the asymmetrical public key; and
upon successful decryption of the encrypted web address, the user terminal determines that said one of the identity verification servers is currently valid to perform identity verification.

8. The network authentication method as claimed in claim 1, wherein:
in step b), the respective set of encrypted information downloaded by each of the identity verification servers further includes an encrypted authorization period associated with the identity verification server; and
step e) includes the sub-steps of
e1) the user terminal determining whether the encrypted web address and the encrypted authorization period associated with said one of the identity verification servers are successfully decrypted using the asymmetrical public key,
e2) upon successful decryption of the encrypted web address and the encrypted authorization period, the user terminal determining whether the current date is within the decrypted authorization period associated with said one of the identity verification servers, and
e3) upon determining that the current date is within the decrypted authorization period associated with said one of the identity verification servers, the user terminal determining that said one of the identity verification servers is currently valid to perform identity verification.

9. The network authentication method as claimed in claim 8, wherein step e) further includes the sub-step of:
e4) when the current date is not within the decrypted authorization period associated with said one of the identity verification servers, the user terminal sending to the downloading unit an expiration notification that the authorization period associated with said one of the identity verification servers has expired.

* * * * *